UNITED STATES PATENT OFFICE.

CHARLES DE LA HARPE, KARL OSWALD, AND ERNST ZEHNTNER, OF BASEL, SWITZERLAND, ASSIGNORS TO THE FIRM OF DYE WORKS FORMERLY L. DURAND, HUGUENIN & CO., OF BASEL, SWITZERLAND.

CONDENSATION DYE FROM GALLOCYANINS AND PROCESS OF MAKING SAME.

No. 898,098.  Specification of Letters Patent.  Patented Sept. 8, 1908.

Application filed April 21, 1908. Serial No. 428,409.

*To all whom it may concern:*

Be it known that we, CHARLES DE LA HARPE, chemist, KARL OSWALD, chemist, and ERNST ZEHNTNER, doctor of philosophy and chemist, all citizens of the Swiss Republic, and residents of Basel, Switzerland, have invented new and useful Derivatives of the Condensation Products of Gallocyanins with Amins and a Process for Making the Same, of which the following is a full, clear, and exact specification.

It is known that the gallocyanins obtained by condensing nitrosocompounds with gallic acid and its derivatives can be condensed with aromatic amins (mono- or polyamins). The intermediate products thus produced, which are little soluble or insoluble, are generally converted by sulfonation into new dyestuffs soluble in water. We have now found that the said, non-sulfonated intermediate products, may be converted, by suitable treatment with acids and reducing agents, into new dyestuffs which differ sharply from the parent materials, the treatment with acids preceding or accompanying the reduction. They are very easily soluble in water and their aqueous solutions are nearly colorless; the solution rapidly becomes blue in air. With concentrated sulfuric acid a green solution is obtained, whereas the parent materials and their leucoderivatives dissolve in concentrated sulfuric acid to a reddish solution; on addition of an oxidant like $MnO_2$ or $K_2CrO_7$, the color of the solution does not change to blue, but remains green and becomes after some time pale, the dyestuff being burned.

The new dyestuffs are of great interest in respect of their application to printing, since with metallic mordants, especially chromium mordants, they give very brilliant, pure blue tints of great uniformity. With discharges a pure white is obtained. According to their behavior they are not proper leuco-derivatives of the parent materials, but the latter appear to be split up and reduced. At all events the original amin is to be detected in the mother liquor.

Example I. 10 parts of a gallocyanin-anilid, for instance the product of the action of anilin on the condensation product from nitroso-dimethyl-anilin and methylgallate are heated with 100 parts of alcohol of 96 per cent. strength and 25 parts of hydrochloric acid of 30 per cent. strength in a reflux apparatus on the water bath, and then is added in the course of 3-4 hours zinc dust in small portions until the original blue color of the alcoholic solution has passed to yellowish green, and a sample no longer dissolves in concentrated sulfuric acid to a reddish violet, but to a pure green solution. For this purpose about 4 parts of zinc dust are needed. After cooling, the dyestuff, which separates in greenish yellow needles is filtered and dried. In the mother liquor anilin can easily be recognized. The dyestuff is easily soluble in pure water, the solution being at first colorless and then becoming blue. In feebly acid water the solution remains colorless or feebly yellowish. When printed on wool with chromium mordants, the dyestuff yields a powerful, pure blue on being steamed.

Example II. 10 parts of a gallocyanin-anilid are suspended in 150 parts of alcohol, and after addition of 1 part of hydrochloric acid and 1 part of zinc dust, the whole is heated to feeble ebullition. 3 parts of zinc dust and 24 parts of hydrochloric acid are then added in alternate doses, until a sample dissolves in concentrated sulfuric acid to a pure green solution. When cold the dyestuff which precipitates, is separated from the mother liquor.

What we claim is:

1. The herein described process for the manufacture of new dyestuffs by treating the products made by condensing a gallocyanin dyestuff with an aromatic amin, with an acid and a reducing agent.

2. As new dyestuffs, the described derivatives of the condensation products of gallocyanin-dyestuffs with aromatic amins, which are very easily soluble in water, giving colorless solutions becoming rapidly blue in air, dissolve in concentrated sulfuric acid with a green coloration, which does not change on the addition of an oxidant but fades only after some time, and give in printing with metallic mordants brilliant pure blue tints of great uniformity.

In testimony whereof, we have hereunto signed our names in the presence of two subscribing witnesses.

CHARLES DE LA HARPE.
KARL OSWALD.
ERNST ZEHNTNER.

Witnesses:
AMAND RITTER,
GEO. GIFFORD.